(12) United States Patent
Varma et al.

(10) Patent No.: US 12,028,180 B1
(45) Date of Patent: Jul. 2, 2024

(54) APPARATUS AND METHOD FOR MONITORING MULTIPARTY STREAM COMMUNICATIONS

(71) Applicant: BREAKOUT LEARNING Inc., Dallas, TX (US)

(72) Inventors: Ramit Varma, Encino, CA (US); Steven Walters, Dallas, TX (US); Joshua Oster-Morris, Atlanta, GA (US)

(73) Assignee: BREAKOUT LEARNING, INC., Dallas, TX (US)

( * ) Notice: Subject to any disclaimer, the term of this patent is extended or adjusted under 35 U.S.C. 154(b) by 0 days.

(21) Appl. No.: 18/543,701

(22) Filed: Dec. 18, 2023

(51) Int. Cl.
*H04L 12/18* (2006.01)

(52) U.S. Cl.
CPC ...... *H04L 12/1831* (2013.01); *H04L 12/1827* (2013.01)

(58) Field of Classification Search
CPC .................. H04L 12/1831; H04L 12/1827
See application file for complete search history.

(56) References Cited

U.S. PATENT DOCUMENTS

| | | | | |
|---|---|---|---|---|
| 11,335,347 | B2* | 5/2022 | Aguilar Alas | G10L 15/063 |
| 11,405,227 | B2* | 8/2022 | Kwatra | H04L 67/568 |
| 2022/0237368 | A1 | 7/2022 | Tran | |
| 2023/0179628 | A1 | 6/2023 | Porras | |

FOREIGN PATENT DOCUMENTS

| | | |
|---|---|---|
| CN | 105427869 A | 3/2016 |
| KR | 10-2051384 B1 | 12/2019 |

\* cited by examiner

*Primary Examiner* — Nazia Naoreen
(74) *Attorney, Agent, or Firm* — Caldwell Intellectual Property Law

(57) ABSTRACT

This disclosure pertains to an innovative approach for enhancing monitoring multiparty stream communication analysis and machine learning applications. The apparatus monitor a multiparty stream communication, wherein the multiparty stream communication includes a first and a second packet series to generate, retrieve, and compare data elements. Training data is filtered and categorized into specific sub-populations, increasing relevance to particular subjects of analysis. These tailored datasets optimize machine learning models, resulting in more precise comprehension assessment.

20 Claims, 6 Drawing Sheets

APPARATUS AND METHOD FOR MONITORING MULTIPARTY STREAM COMMUNICATIONS

FIELD OF THE INVENTION

The present invention generally relates to the field of computer scient and machine learning. In particular, the present invention is directed to an apparatus and method for monitoring multiparty stream communication.

BACKGROUND

Multiparty communication platforms that stream multiple participants' inputs lack the ability to track and process those inputs effectively for analysis and evaluation of the data, particularly where data from disparate sources must be tracked simultaneously.

SUMMARY OF THE DISCLOSURE

In an aspect, apparatus for monitoring multiparty stream communication may include at least a processor; and a memory communicatively connected to the at least a processor, wherein the memory containing instructions configuring the at least a processor to monitor a multiparty stream communication, wherein the multiparty stream communication includes a first packet series from a first remote device to a communication hub, wherein the first packet series encodes a first audio input sequence; and a second packet series from the communication hub to a second remote device; the apparatus includes generate at least a communication vector using at least one of the first packet series and the second packet series; retrieve a target vector representing a semantic target; the apparatus may include compare the communication vector to the target vector; and generate a response as a function of the comparison.

In another aspect, a method for monitoring multiparty stream communication comprising monitoring a multiparty stream communication, wherein the multiparty stream communication is configured to include a first packet series from a first remote device to a communication hub, wherein the first packet series encodes a first audio input sequence; and a second packet series from the communication hub to a second remote device. The method further includes generating at least a communication vector using at least one of the first packet series and the second packet series. The method includes retrieving a target vector, wherein the target vector is configured to represent a semantic target. The method further includes comparing the communication vector to the target vector and generating a response as a function of the comparison.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for monitoring multiparty stream communication. In an embodiment, apparatus of diverse machine learning algorithms and the categorization of training data into specific sub-populations, significantly increasing the relevance of depth detection to particular subjects of analysis.

Figure 1:
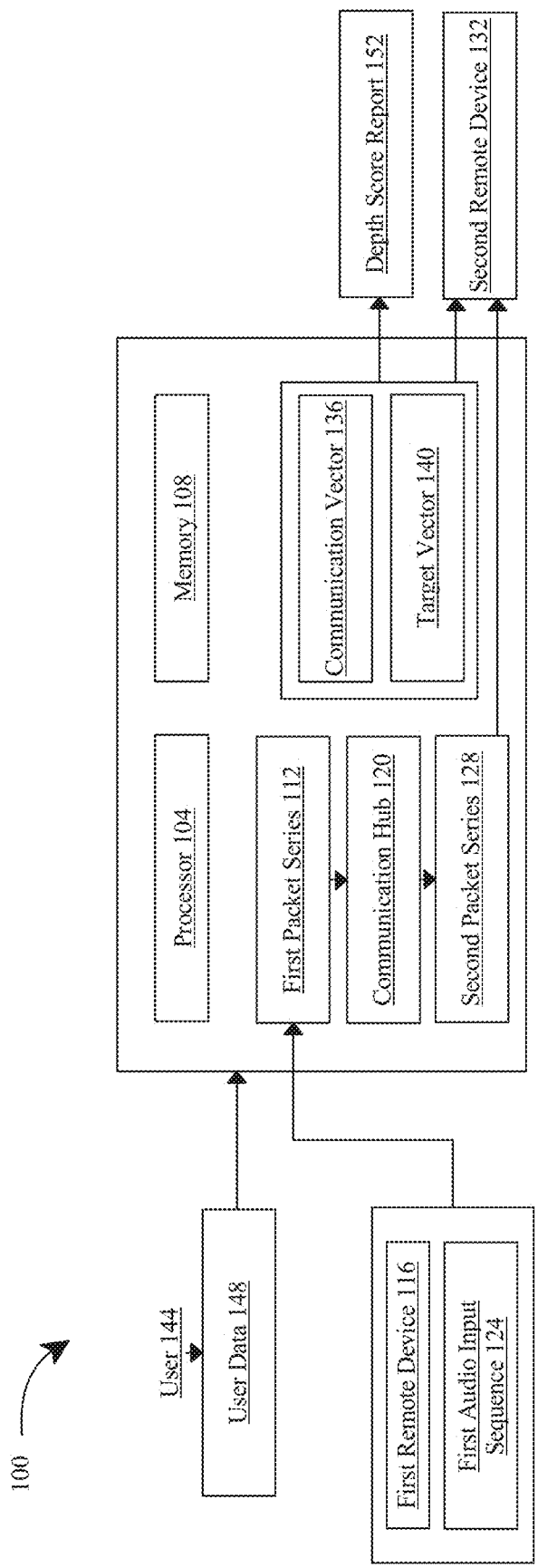
FIG. 1 is a block diagram of an exemplary embodiment of an apparatus for depth detection in conversation.

Referring now to FIG. 1, an exemplary embodiment of an apparatus 100 for depth detection in conversation is illustrated. The apparatus 100 includes a processor 104. Computing device includes a processor 104 communicatively connected to a memory 108. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Further referring to FIG. 1, apparatus 100 may include any computing device as described in this disclosure, including without limitation a microcontroller, microprocessor, digital signal processor (DSP) and/or system on a chip (SoC) as described in this disclosure. apparatus 100 may include, be included in, and/or communicate with a mobile device such as a mobile telephone or smartphone. Apparatus 100 may include a single computing device operating independently, or may include two or more computing device operating in concert, in parallel, sequentially or the like; two or more computing devices may be included together in a single computing device or in two or more computing devices. apparatus 100 may interface or communicate with one or more additional devices as described below in further detail via a network interface device. Network interface device may be utilized for connecting apparatus 100 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. apparatus 100 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented, as a non-limiting example, using a "shared nothing" architecture.

With continued reference to FIG. 1, Apparatus 100 may be designed and/or configured to perform any method, method step, or sequence of method steps in any embodiment described in this disclosure, in any order and with any degree of repetition. For instance, Apparatus 100 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Apparatus 100 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, processor 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a processor module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

Still referring to FIG. 1, processor 104 is configured to monitor a multiparty stream communication. A "multiparty stream communication," as used in this disclosure, is a process in which two or more parties communicate over a packet-switched network using a stream of packets of audio and/or visual data. This communication method is limited to the exchange of audio and/or visual data over the network and excludes other forms of communication such as text chats, phone calls, or non-streaming data transfers. In some cases, the multiparty stream communication may be exemplified by a video conference call where team members from various geographical locations collaborate on a project. In a non-limiting example, each user may stream their audio and video feed in real-time, allowing for simultaneous interaction, feedback, and discussions among all users. As used in this disclosure, "user" is any individual, entity, or system that interacts, communicates, or engages with apparatus 100. In some cases, user may include one or more students, parents, teachers, administrators, or any other stakeholder in an educational setting. In a non-limiting example, user may include a student or learner who is the primary recipient of educational content or instruction delivered by apparatus 100. However, it should be noted that the term "user" is not limited to student and can encompass any individual or entity that utilizes the apparatus for any purpose. For example, an without limitation, in some embodiments, user may be an educator using the apparatus to monitor and assess on or more second users e.g., students' engagement and participation.

With continued reference to FIG. 1, in some embodiment, multiparty stream communication may include a first packet series 112 from a first remote device 116 to a communication hub 120. As used in this disclosure, a "packet series" is a sequence or collection of data units utilized in digital communication system. Data units may be known as "packets." Packets may be formatted units of data carried by packet-switched networks. Packet may consist of control information and user data. Control information may provide data for the delivery of the payload. Control information may include details such as source and destination network addresses, error detection codes, sequencing information, and the like. Typically, control information may be encapsulated in packet headers and, in some cases, trailers. In packet-switched networks, the available bandwidth of the transmission medium may be shared among multiple communication sessions, may distinguish it from circuit switching, circuits may be allocated for the entire session. Data may be transmitted in the form of discrete packets, each discrete packet comprising a header with control information and a payload containing user data. For instance, in Internet Protocol (IP) networks, IP packets are composed of headers and payloads. The header may contain fixed and optional fields, while the payload may carry the actual data. IP packets may often be carried as payloads inside Ethernet frames, each with its own header and trailer. Additionally, various standards, such as the Consultative Committee for Space Data Systems (CCSDS) for deep space telemetry or MPEG for multimedia streaming, may employ packetization to efficiently transmit data over networks. These packets may traverse the network independently, and may take varied routes to reach their destination. Upon arrival, a receiving system may orchestrate these packets, reassembling them to reconstruct the original message or data content. For example, packets may include, but not limited to, short video clips, and short content list. As used in this disclosure, a "remote device" is an element of electronic equipment, apparatus, or system situated at a distance from a primary device or central system and capable of transmitting, receiving, processing, or storing data. A remote device may include, without limitation, computing devices, smartphones, tablets, laptops, desktop computers, smart watches, IoT (Internet of Things) devices, servers, network routers, wearable devices, drones, sensors, cameras, and any other electronic devices capable of communication. A remote device can operate over various communication channels like wireless networks, cellular networks, satellite connections, Bluetooth, Wi-Fi, or any other data transmission methods. It may function autonomously or be controlled, accessed, or monitored by another device or central system, irrespective of geographical or spatial constraints. As a non-limiting example, remote device may be a smart security camera set up at the entrance of the home and constantly monitors for movement or activity. As used in this disclosure, a "communication hub" is a computing device, system, and/or platform that facilitates, manages, or coordinates the exchange, transmission, or reception of data between multiple devices, networks, or systems. A communication hub may include, without limitation, a router, switch, server, a platform such as a cloud services platform, a data center, or any other computing device as described in this disclosure. A communication hub may be configured to perform processes that vary from relaying data to more complex operations such as data processing, filtering, storage, conversion of data types, or the like. Communication hub may operate over varied mediums including wired networks, wireless channels, optical fibers, satellite links, or any combination thereof. In a non-limiting example, communication hub, in this case, may be the classroom's main server or the cloud-based platform provided by the digital response system's vendor.

With continued reference to FIG. 1, in some embodiments, first packet series 112 may encode a first audio input sequence 124. A "audio input sequence," for the purpose of this disclosure, For the purpose of this disclosure, an "audio input sequence" is to a series or chain of audio signal samples and/or data, including without limitation data packets containing samples or series of samples that in combination may represent amplitude, frequency, and other data of an audio signal. An audio input sequence may be generated and/or produced from various sources, such as without limitation audio inputs ranging from monophonic sound recordings to complex multichannel audio arrangements. Audio input sequence may be captured, without limitation, using audio input sensors and/or transducers such as microphones, including without limitation microphone arrays as described in this disclosure. An audio input sequence might originate from various sources such as voice commands, spoken words, musical instruments, environmental sounds, or any other audible phenomena. Audio input sequence may be converted from and/or to an analog audio signal. Audio input sequence may be subjected to various signal processing algorithms and/or transformations such as compression, amplification, filtering, encoding, and the like. In some contexts, audio input sequence may also encompass metadata, annotations, or supplementary data streams that provide additional information about the primary audio content.

With continued reference to FIG. 1, in some embodiments, processor 104 may be configured to use a large language model to identify emotional cues and semantic patterns within audio input sequence 124. As used in this disclosure, "emotional cues" is a diverse range of auditory indications, vocal nuances, intonations, or patterns within a speech or sound sequence that can suggest, imply, or denote a speaker's or sound source's emotional state, intent, or feeling. These cues can encompass a broad spectrum of emotions such as happiness, sadness, anger, excitement, fear, surprise, frustration, and more. Emotional cues might be gleaned from variations in pitch, tone, rhythm, volume, speed, or even from certain key phrases and words. They might also emerge from non-verbal sounds, like sighs, laughter, or hesitations.

With continued reference to FIG. 1, as used in this disclosure, "semantic pattern" is a recognizable and repeatable structures, formations, or sequences in spoken or written content that convey meaning, intent, or information. These patterns can emerge from the arrangement of words, phrases, or sentences, the context in which they are used, or the relationships between different elements of the content. In a non-limiting example, to identify emotional cues, student's voice may first be transcribed into text with automatic speech recognition system within the large language model. The large language model may analyze the transcribed text for words or phrases often associated with emotions, e.g., "I am so frustrated with this topic" or "I am thrilled." For example, rapid speech may indicate excitement or anxiety; a low pitch might indicate sadness or disappointment. To identify sematic patterns using the large language model may include first identifying the central themes or subjects that the student frequently discusses. Large language model may recognize patterns in student's speech or writing. For instance, if a student frequently starts sentences with "I think," it might suggest uncertainty.

With continued reference to FIG. 1, in some cases, multiparty stream communication may include a second packet series 128 from communication hub 120 to a second remote device 132. As used in this disclosure, a "second packet series" is a distinct set or sequence of data packets, that is transmitted, relayed, or facilitated via a communication hub 120 to the second remote device 132; second packet series may be subsequent to or in response to a prior packet series such as without limitation first packet series. The second packet series may be sent immediately following first packet series 112 or after a predefined delay. Second packet series 128 may be based on standardized communication protocols, it may also be tailored to proprietary or specialized communication standards, depending on the system's requirements. Second packet series 128 may include redundant packets, error-checking data, or correction codes to ensure reliable and accurate data transmission. As a non-limiting example, an online classroom setting may utilize communication hub 120 as a central platform to manage real-time interaction among students and the instructor. Each student may have a remote device, for example, a laptop, tablet, smartphone, or any educational device. Activities involve both students and the instructor sending and receiving data packets, may contain videos, text, or other types of education content. First, communication hub 120 may send out second packet series 128 to all remote device 116. Packet series may contain various types of data, including quiz questions, timer information, and multimedia elements related to the questions. For instance, the first student may quickly answer the quiz and packet series may be sent back to communication hub 120. In this case, the packet series may contain the student's responses, such as selected answers and completion time. Meanwhile, the second student may encounter difficulty with a question, prompting communication hub 120 to process incoming packet series. For the first student who has completed the quiz, communication hub 120 may recognize task completion and respond with a packet series containing a 'Please Wait' message, indicating that the student should wait for further instructions or the next phase of the activity. Conversely, for the second student facing a challenging question, second packet series 128 may be sent from communication hub 12. Packet series may contain additional guidance or hints related to the difficult question, assisting the student in overcoming the obstacle. Throughout class disclosure, various forms of data may be transmitted within packet series, including quiz responses, messages, hints, multimedia content and the like.

With continued reference to FIG. 1, in some cases, multiparty stream communication may be configured to comprise a microphone array. As used in this disclosure, a "microphone array" is a collection of or one device working to capture audio from multiple directions or sources. Depending on the application, the number of microphones may also vary. For example, a professional sound recording studio or advanced research setup may utilize dozens or even hundreds. In some embodiments, microphone array may include collecting speech input data of a user 144. As used in this disclosure, "speech input data" is information derived from the auditory signals produced when a user speaks. The speech input data may encompass not only the raw audio waveform but also associated characteristics and derivations. Speech input data may consist of a basic audio waveform that captures the variation in sound pressure levels over time as a person articulates words and sentences. In a non-limited example, a student may ask a question in class. As she speaks, microphone array within the students first remote device 116 captures words, focusing on the voice while minimizing extraneous noises. "Extraneous noise," described in this disclosure, is any outside noises that isn't the user. For example, but not limited to laptop fan and distant city traffic. The raw, analog vocal waveform is swiftly converted into a digital signal through an Analog-to-Digital Converter (ADC), creating the foundation of speech input data.

In some embodiment, microphone array may include generating user data 148 as a function of the speech input data. In some cases, "user data" may include, without limitation, personal information (e.g., user's name, email address, mailing/billing address, contact information, etc.), demographic information (e.g., age, gender, field of study, occupation, etc.), user preference data (e.g., preferred language, accessibility needs, interests, hobbies, etc.) among others. In a non-limiting example, if user data is defined as a non-native English speaker based on their demographic information and preferred language settings, in some cases, apparatus 100 may be configured to automatically adjust the content delivery to present information in the user's preferred language or offer additional language support tools such as real-time translations or subtitles. In a non-limiting example, using the processed speech input data from user 144, apparatus 100 may generate user data 148.

Still referring to FIG. 1, processor 104 is configured to generate at least a communication vector 136 using first packet series 112 and second packet series 128. As used in this disclosure, a "communication vector" is a mathematical or data-driven representation capturing the essence, characteristics, or information contained within communication packets transmitted over a network. Stemming from the vector representations in data analysis, the communication vector 136 can encompass a wide array of attributes. It might represent the frequency, direction, magnitude, or content significance of transmitted data. For instance, in multiparty stream communication, such a vector could encode the sequential order of message exchanges, prioritize topics or subjects within the communication, or even encapsulate semantic or sentiment values deduced from the conversation content. The construction of this vector can leverage various methodologies, from simple data aggregation and statistical measures to complex neural network embeddings. When derived from multiple packet series, as in the context of first packet series 112 and second packet series 128, the communication vector might serve as a synthesis or comparative analysis tool, amalgamating key attributes from both series to produce a consolidated or differential overview. In a non-limiting example, user 144 may send in her ideas in first packet series 112. Simultaneously, another user from another team may send in technical feedback and suggestion, constituting second packet series 128. Communication vector 136 may include the back-and-forth nature of conversations and determine if the feedback is positive, negative, or neutral based on linguistic analysis.

Still referring to FIG. 1, processor 104 is configured to retrieve a target vector representing a semantic target, wherein the "target vector," for the purpose of this disclosure, is a pre-defined, optimized, or standard representation encapsulating specific "semantic target" or informational assessment rubric that apparatus 100 to achieve. Target vector may be formulated based on expert inputs, historical data, or machine learning outputs. For instance, in a language processing system, target vector could be shaped around the perfect articulation of a concept, the most comprehensive summary of a topic, or even the sentiment ideal for a specific communication. When juxtaposed with communication vectors or other data-derived vectors, target vector may serve as a benchmark, helping in assessing deviations, similarities, or gaps. Moreover, in adaptive and learning systems, the definition or attributes of a target vector might not be static. It can evolve based on new data, feedback loops, or changing system objectives.

With continued reference to FIG. 1, in some embodiment, retrieving the target vector further includes entering user subject data. As used in this disclosure, "user subject data" is a collection of information, guidelines, or content specifics provided by a user. User may be directive or foundational role within apparatus. The user subject data may be reflection of user's expertise, preferences, objectives, or focal points. In a non-limiting example, user subject data may include syllabus outlines, key learning objectives, assessment criteria, or even nuanced feedback on student performance. For example, an instructor, educator, or any domain expert can supply these details, ensuring the system has a clear understanding or framework to operate within.

With continued reference to FIG. 1, in another embodiment, retrieving the target vector further includes performing a local vector analysis. As used in this disclosure, a "local vector analysis" is an evaluation, assessment, or processing of vector representations within a specified, confined, or immediate data domain or context. Local vector analysis may have narrows focus, honing in on specific subsets, contextual data points, or relevant segments of the information landscape. In the realm of linguistic or textual data, for example, local vector analysis might concentrate on the semantic target of a particular sentence, paragraph, or topic, as opposed to the entire document or corpus. In graphical or spatial contexts, it might entail evaluating vector attributes within a certain region, cluster, or proximity radius. Furthermore, the "local" in local vector analysis may also be temporal, thematic, or even hierarchical. For instance, in time-series data, the analysis may focus on a specific timeframe. In a hierarchical structure, it might zero in on a particular node and its immediate neighbors.

In a non-limiting example, still referring to FIG. 1, apparatus may employ a score analysis module, which is configured to generate a depth score (described further below in this disclosure). The depth score may be calculated using a language analysis model configured to generate target vector that may encapsulate key aspects of the analyzed content. To generate target vector, the language analysis model may be designed to process and analyze the content within the conversation data comprehensively. The language analysis model may employ advanced techniques such as neural networks, deep learning algorithms, or other machine learning models. Those techniques may enable the model to identify semantic patterns, emotional cues, and linguistic nuances within the data. Subsequently, it may generate a target vector that encapsulates the essence of the conversation, allowing for precise depth score computation. apparatus may also generate a communication vector using a dedicated process. Dedicated process may use machine learning techniques like neural networks or other models to analyze the first packet series and the second packet series. Communication vector may serve as a representation of the content exchanged between participants. For example, the language analysis model may utilize neural networks to detect emotional cues and semantic patterns within the conversation, making it adept at understanding the context and sentiment behind the words spoken. Similarly, communication vector generation process may leverage machine learning algorithms to capture the essence of data exchanged within packet series. In this case, a lecturer has just finished teaching on a topic and wishes to assess how deeply students have comprehended the topic. The lecture first provides a concise and comprehensive summary of the main points, for example, "quantum entanglement," "wave-particle duality," and "Heisenberg's uncertainty principle," and the like in a physics class. The language analysis model may process the summary, transforming the textural data into a high-dimensional vector space, creating target vector 140. Post-lecture, students may prompt to submit short essays or summaries reflecting their understanding of the topic. Each of these responses may be raw data waiting to be vectorized. Apparatus 100 may perform local vector analysis to vectorize each individual student summaries. Once the individual student vectors are ready, apparatus 100 may compare each student's vector to the predefined target vector 140. The closer a student's vector aligns target vector 140, the deeper their comprehension is gauged to be.

Still referring to FIG. 1, processor 104 is configured to compare communication vector 136 to target vector 140. In a non-limiting example, a student's verbal response to a question in a classroom may be recorded, transcribed, and processed to generate communication vector 136. Communication vector 136 may include the student's understanding, represented as an array of values derived from keywords, phrases, and context. Target vector 140 may represent the ideal concept of the lecture. This comparison between communication vector 136 and target vector 140 may be achieved through a range of techniques, including measures of geometric similarity, such as cosine similarity, fuzzy set comparisons, inputting both vectors into a machine-learning model or neural network to output a similarity metric, element-wise comparison, or other methods as deemed suitable. The versatility of these comparison methods may allow for a comprehensive assessment of the alignment between the student's comprehension and the intended lecture concept. Apparatus 100 may be pre-configured with vector comparison techniques such as the cosine similarity between the vectors is then calculated. For example, a student's answer may yield a similarity score of 0.9 to the model answer, it may suggest that the student's understanding is closely aligned with the expected concept. Another student may yield a score of 0.4, apparatus 100 could provide feedback suggesting the student revisit specific aspects of the lecture with highlighted areas where their understanding deviated from the expected concept.

With continued reference to FIG. 1, in some embodiment, comparing communication vector 136 to target vector 140 may further include defining an information depth metric. As used in this disclosure, an "information depth metric" is the extent, thoroughness, and depth to which an individual understands or internalizes a particular subject, concept, or information. The information depth metric may encompass multiple layers of understanding, ranging from a superficial or rudimentary awareness to a profound, nuanced, and detailed grasp. Information depth metric can be influenced by various factors, including the complexity of the subject, the individual's prior knowledge, cognitive abilities, and the effectiveness of the instructional method. In the context of comparing vectors, information depth metric might manifest as the magnitude, direction, or density of communication vector 136 in relation to target vector 140. For example, a perfect alignment might indicate a full comprehension, while significant deviations might indicate areas of misunderstanding or gaps in knowledge. Additionally, information depth metric can be quantified using metrics, scores, or levels to provide a measurable representation of understanding, aiding educators or systems in tailoring subsequent instruction or feedback. In an embodiment, defining depth of compression may use a large language model (further described below), the large language model may process the conversation data in relation to the assessment rubric. As a non-limiting example, in a classroom setting, students may be given an assignment to pen essays on "The Impact of the Industrial Revolution on Modern Economies." The educator prepared a detailed assessment rubric to grade. Assessment rubric may pinpoint essential themes such as the timeline of the Industrial Revolution, emergence of new industries, socio-economic shifts like urbanization, its global influence, and its long-term imprint on contemporary economic structures. Each student's essay may be distilled into communication vector, a representation of its semantic content. Concurrently, the rubric may be molded into target vector. For instance, if an essay tackled the first three themes but skimmed over the last two, apparatus 100 may deduce a moderate information depth metric. The language model may also offer feedback. The student would be presented with insights on the latter phases of the Industrial Revolution, perhaps even being directed at additional resources. In another embodiment, a Boolean analysis may be executed inside the large language model, utilizing prompts for within-model comprehension analysis. As used in this disclosure, a "Boolean analysis" is a method of evaluating and relating logical statements or expressions based on the binary logic principles set forth by mathematician George Boole. This form of analysis hinges on the binary values "true" or "false", often represented as "1" or "0", respectively. In the context of digital computation and logical operations, Boolean analysis encompasses operations such as AND, OR, NOT, NAND, NOR, XOR, etc. In the context of the present disclosure, Boolean analysis might be applied to dissect and analyze data, filtering relevant content, determining the presence or absence of specific criteria, or even evaluating multiple criteria in conjunction to derive a particular outcome or understanding. As a non-limiting example, Using Boolean analysis within the model, each student's contribution may be scrutinized against these criteria. For example, during an open classroom discussion resalted to the ethical implications of Artificial Intelligence (AI) in modern society, student may mention terms and phrases related to 'bias in data' or 'prejudiced machine decisions', the "AI bias" criterion is evaluated as "true" or "1" for that student. Conversely, if there's no mention of 'job loss', the "job displacement due to AI" criterion stands as "false" or "0". Moreover, the educator can input prompts like "Discuss how AI can sometimes reinforce societal biases" to guide the discussion and gauge real-time comprehension. As the session concludes, the Boolean analysis, executed within the large language model, offers a binary matrix indicating each student's understanding against the predefined criteria.

With continued reference to FIG. 1, apparatus 100 may employ a vector matching technique to evaluate the depth of comprehension within the conversation. The vector matching technique involves representing each concept and semantic equivalent (such as a word or phrase) as a vector. Words and phrases from the discussion may be mapped into vectors. Apparatus may proceed to compare these vectors, assessing vector proximity in terms of similarity, often measured using cosine similarity or other relevant metrics that gauge how closely they align in direction. For example, if vectors are within a predefined threshold of similarity, apparatus may score a point, signifying a degree of alignment with the rubric's expected concepts and comprehension. Alternatively, a weighted addition approach may be utilized further enhancing the granularity and precision of the assessment. As used in this disclosure, With continued reference to FIG. 1, as used in this description, "non-Boolean counting" is a search approach to search techniques that diverge from the conventional Boolean model techniques. For example, Boolean functions can be average and counted by inferring the structure of the function by evaluating it at non-Boolean inputs. Non-Boolean logic violates the "rule of the excluded middle" which is best characterized by a Boolean two-valued logic with truth values "true" and "false." Booleans may be used with control statement to determine the flow of a program. For example, when the Boolean value "x" is true, a statement may happen while value "x" is false, another statement may present. One variation of non-Boolean counting may involve employing functions that go beyond binary evaluations. For example, instead of straightforward true or false assessments, non-Boolean counting may entail calculating averages or making inferences by evaluating functions at non-Boolean inputs. Non-Boolean counting may transcend the rigid binary nature of Boolean logic, allowing for a more nuanced and probabilistic assessment. Another variation may pertain to the use of non-Boolean logic for control flow and programmatic decisions. In traditional Boolean logic, control statements determine the flow of a program based on the binary evaluation of conditions (true or false). In contrast, non-Boolean counting may introduce a more flexible approach where control statements can consider a spectrum of values, allowing for conditional actions based on a broader range of input conditions. For example, when a non-Boolean value "x" falls within a certain range or meets specific criteria, a corresponding programmatic statement may be executed, enabling a more adaptive and context-aware decision-making process.

With continued reference to FIG. 1, apparatus may utilize technique of aggregation and normalization to process data. The aggregation process may involve combining counts of appearances or scores, such as those obtained from assessing the relevance or similarity of data vectors to desired concepts. Aggregation methods may include averaging with arithmetic or geometric means, combining scores through weighted sums, where weights correspond to the degree of similarity between vectors representing desired concepts. The weighting process may ensure that scores contribute proportionally to their degree of relevance or similarity, where exact matches may receive full weight, and as the angle between vectors increases, the contribution diminishes proportionally. This weighted aggregation results in an overall score for the assessed topic, reflecting the cumulative comprehension level based on the relevance and similarity of data. Subsequently, apparatus may employ normalization to maintain consistency and comparability across different assessments. Normalization may entail dividing the aggregated vector by its "norm" or overall length, effectively scaling the vector to a length of 1. The normalization process may ensure assessments remain within a standardized range, facilitating fair comparisons and preventing the distortion of results due to varying data scales.

Still referring to FIG. 1, processor 104 is configured to generate a response as a function of the comparison. As used in this disclosure, a "response" encompasses a wide range of actions that apparatus may undertake in reaction to assessing the alignment of the conversation with the rubric. Response may entail generating new prompts, displaying information to an instructor, providing customized recommendations to participants, or executing any relevant action based on the evaluation of how closely the conversation adheres to the rubric's criteria. Response may reflect any action taken by apparatus to adapt or interact further in light of the assessed conversation depth and alignment with the rubric. As a non-limiting example, the response may act as a real-time feedback for the educator, assisting educators dynamically tailoring teaching according to immediate needs of the students.

With continued reference to FIG. 1, in some embodiment, the response may further include generating a depth score report 152 as a function of a depth analysis. Within the context of this disclosure, a "depth score" encompasses both quantitative and qualitative measures of comprehension levels in user subject data for individual participants and collective participant groups. The depth score may serve as an indicator of the depth to which the subject matter is understood, assimilated, and can be applied or discussed by the participants. Depth score report may include evaluating the depth of comprehension, ranging from surface-level knowledge to profound understanding, and quantifying comprehension in a manner that aids educators, decision-makers, or other stakeholders in gauging the effectiveness of communication and the depth of learning achieved. Depth score could be based on a variety of metrics, including the frequency and relevance of key concepts mentioned, the quality of questions or discussions held, or other indicators that reflect a participant's understanding. For groups, the score might also consider the collaborative engagement and the cohesiveness of their collective comprehension. A "depth score report," as used in this disclosure, is a systematic presentation or document that encapsulates, organizes, and conveys the results of the depth score evaluations for individual participants and/or groups. This report may encompass key metrics, visual representations, qualitative insights, and potential recommendations derived from the depth scores. It may serve as a tool to provide an overview of comprehension levels, highlight areas of strength and areas that may require further attention, and offer a means for educators, trainers, or system administrators to track, analyze, and improve the learning or conversational outcomes over time. The report can be tailored to be concise for quick glances or detailed for in-depth analysis, and it might be presented in various formats, including digital dashboards, printable documents, or interactive web portals. In a non-limiting example, depth score report for the week may present a visual bar chart showcasing the average depth scores for each lecture topic. Individual student scores may be anonymized and plotted on a scatter plot to indicate the distribution of comprehension within the class. The report may highlight specific concepts or topics that had the lowest depth scores, suggesting they might need revisiting or additional resources. Furthermore, depth score report may provide qualitative insights. For instance, it may note that when discussions involved real-world applications of the theory, students' depth scores improved. Conversely, abstract concepts without practical examples had lower depth scores.

With continued reference to FIG. 1, in some embodiment, generating depth score further includes assigning weights to target vector 140. In a further embodiment, generating depth score may use a deep learning algorithms and geometric vector comparison. In a non-limiting example, a professor performs a lecture on the cardiovascular system to the class. To ensure the students understand foundational concepts of heaty anatomy and function, blood flow, and major blood vessels, apparatus 100 may assign higher weights to target vectors representing foundational concepts. When students engage in post-lecture discussions, their conversation data is converted into communication vectors. A deep learning algorithm may be employed to compare these communication vectors with the weighted target vectors. Through geometric vector comparison, it may assess how well student discussions align with the lecture topic. For example, if a student discuss the heart's chambers and blood flow direction accurately, their communication vector would be geometrically closer to target vectors of these foundational concepts.

With continued reference to FIG. 1, in some embodiment, generating the response further comprises adapting a large language model as a function of communication vector 136 and target vector 140. As used in this disclosure, a "large language model" is a computational model, often based on deep learning architectures, that is trained on vast amounts of textual data. These models are designed to understand and generate human-like text based on the patterns they have learned from their training data. Such models are capable of understanding context, capturing semantic relationships, making predictions, and assisting in various natural language processing tasks.

Still referring to FIG. 1, processor 104 is configured to display depth score report 152. As used in this disclosure, "display" is the presentation of information, data, or visual content to a user via a visual medium. This encompasses a broad range of methods and devices through which the content can be visually rendered and made accessible to the end user. Such mediums include, but are not limited to, electronic screens like those on computers, tablets, smartphones, and smart displays, projection systems, augmented reality or virtual reality headsets, and even printed formats. The act of displaying could involve graphical elements, textual information, animations, or a combination thereof, and may include dynamic changes in response to user interactions or system updates.

Figure 2:
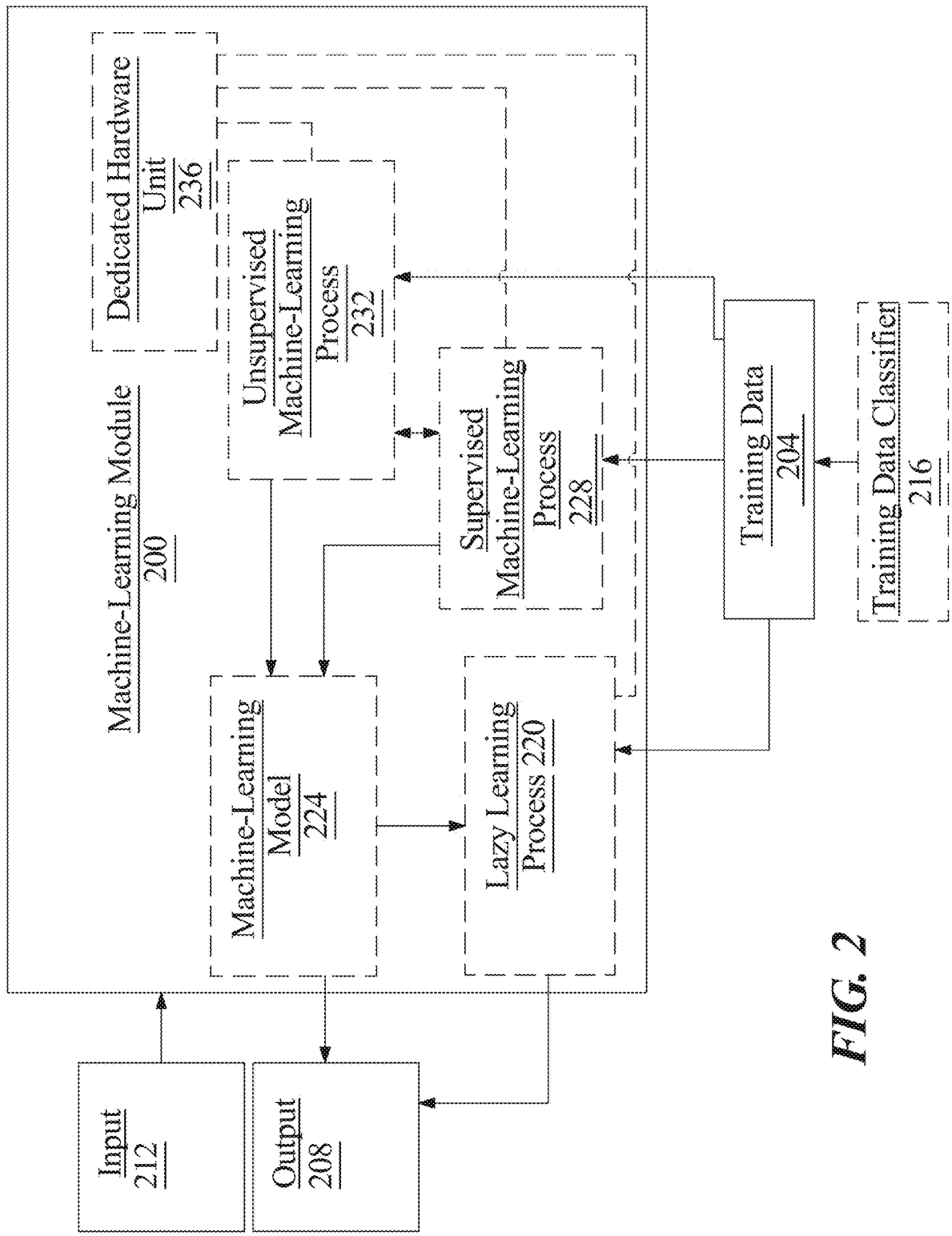
FIG. 2 is a block diagram of an exemplary embodiment of a machine learning module.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example, consider apparatus for monitoring multiparty stream communication. Apparatus uses carious machine-learning algorithms to interpret communication and gather conversation data.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a process whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/ or neural network-based classifiers. As a non-limiting example, training data classifier 216 may classify elements of training data to encompass conversations relevant to the targeted subject. Within each cohort, discussions may be labeled with depth categories like "Basic Understanding" and "Advanced Understanding" based on expert assessment and subject-specific rubrics. Moreover, apparatus may place importance on subject-relevant conversation features during data preprocessing.

Still referring to FIG. 2, computing device 204 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 204 may then calculate a likelihood table by calculating probabilities of different data entries and classification labels. Computing device 204 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 2, computing device 204 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 2, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 2, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, standardization may include utilizing algorithms for identifying duplicate entries or spell-check algorithms.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 124. Processor may interpolate the low pixel count image to convert the 100 pixels into 124 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 2, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 2, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max} : X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the 25$^{th}$ percentile value and the 50$^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 2, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs as described in this disclosure as inputs, outputs as described in disclosure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 232 may not require a response variable; unsupervised processes 232 may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 236. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 236 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 236 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 236 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 3:
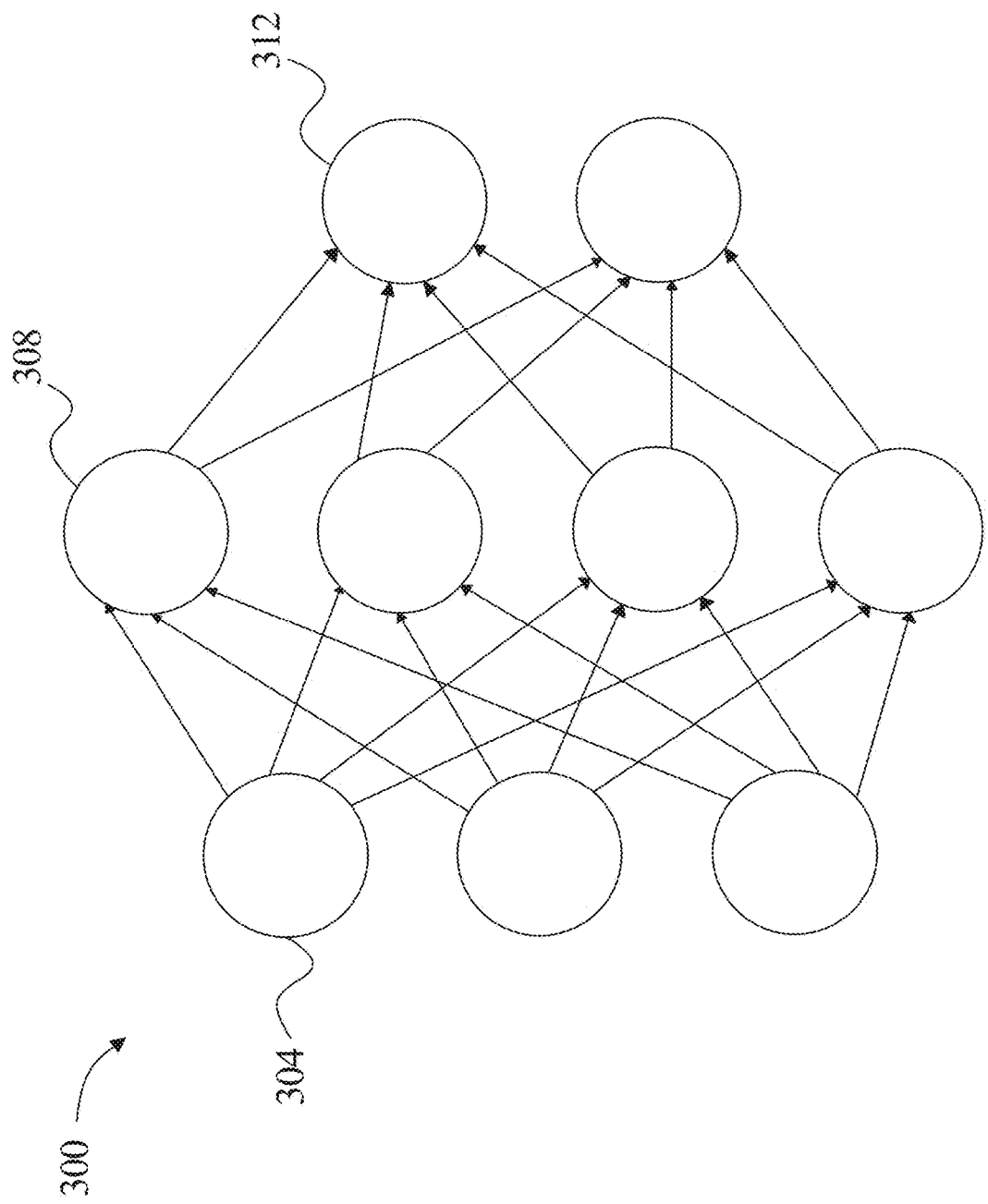
FIG. 3 is a diagram of an exemplary embodiment of a neural network.

Referring now to FIG. 3, an exemplary embodiment of neural network 300 is illustrated. A neural network 300, also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 304, one or more intermediate layers 308, and an output layer of nodes 312. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 4:
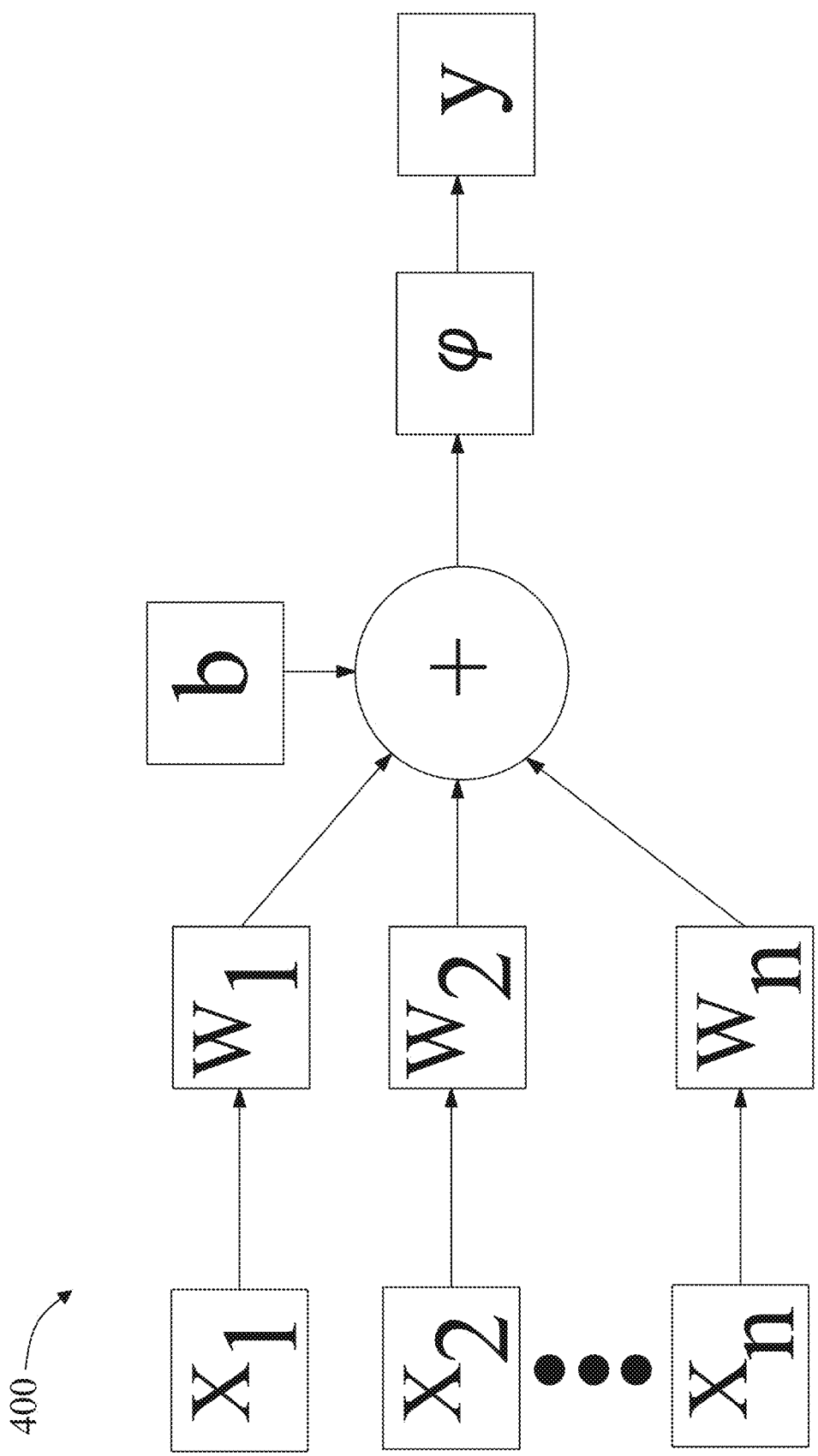
FIG. 4 is a block diagram of an exemplary embodiment of a node of a neural network.

Referring now to FIG. 4, an exemplary embodiment of a node 400 of a neural network is illustrated. A node may include, without limitation, a plurality of inputs $x_i$, that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=\alpha(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$, that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 5:
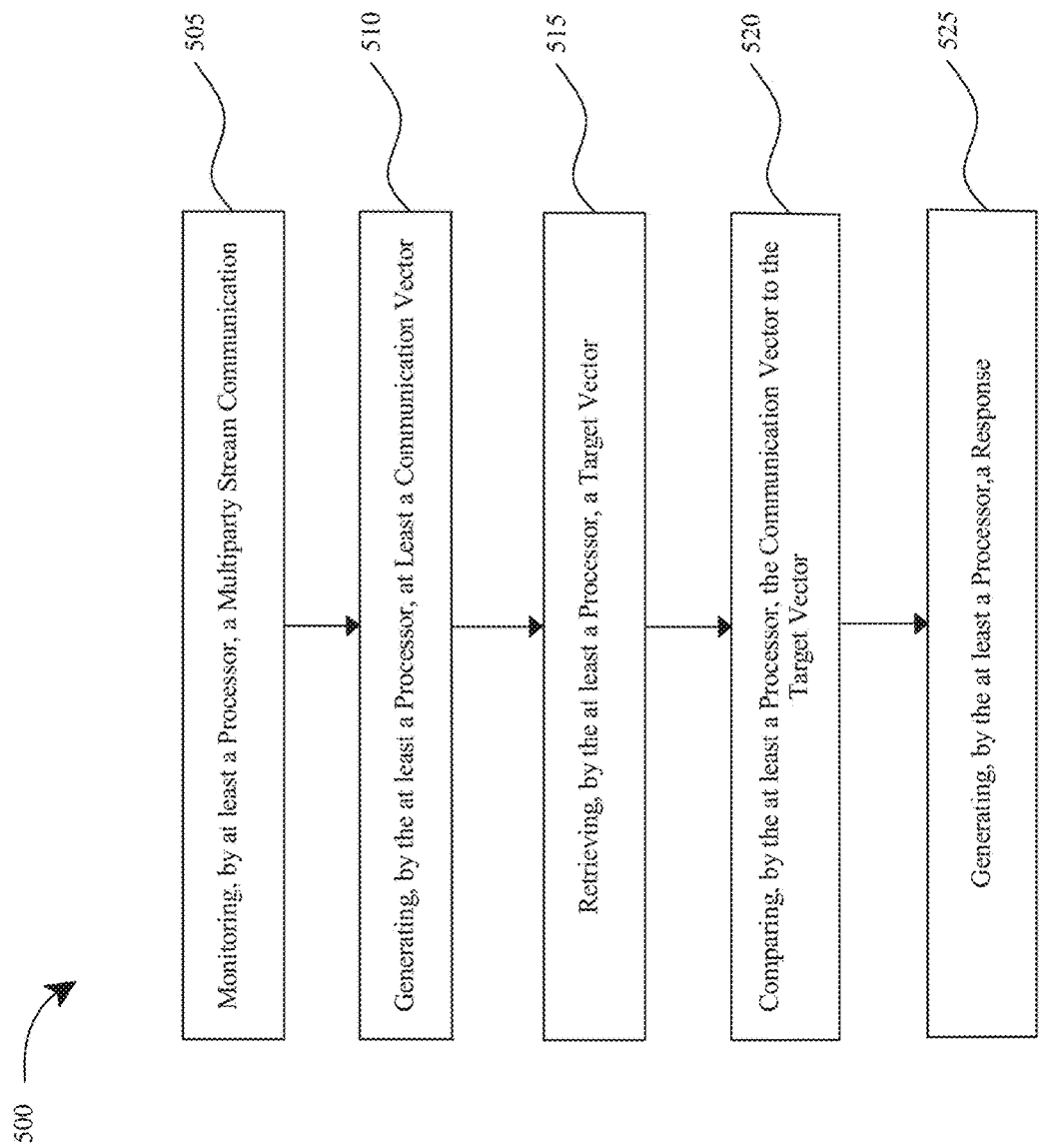
FIG. 5 is a flow diagram illustrating an exemplary work flow in one embodiment of the present invention.

Referring now to FIG. 5, a flow diagram of an exemplary method 500 for monitoring multiparty stream communications. The method 700 includes a step 705 of monitoring, by at least a processor, a multiparty stream communication. Wherein the multiparty stream communication is configured to include a first packet series from a first remote device to a communication hub, wherein the first packet series encodes a first audio input sequence; and a second packet series from the communication hub to a second remote device. This may be implemented, without limitation, as described above with reference to FIGS. 1-4.

With continued reference to FIG. 5, method 500 includes step 510 of generating, by the at least a processor, at least a communication vector using at least one of the first packet series and the second packet series. This may be implemented, without limitation, as described above with reference to FIGS. 1-4.

With continued reference to FIG. 5, method 500 includes step 515 of retrieving, by the at least a processor, a target vector, wherein the target vector is configured to represent a semantic target. This may be implemented, without limitation, as described above with reference to FIGS. 1-4.

With continued reference FIG. 5, method 500 includes step 520 of comparing, by the at least a processor, the communication vector to the target vector. This may be implemented, without limitation, as described above with reference to FIGS. 1-4.

With continued reference FIG. 5, method 500 includes step 525 of generating, by the at least a processor, a response as a function of the comparison. This may be implemented, without limitation, as described above with reference to FIGS. 1-4.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
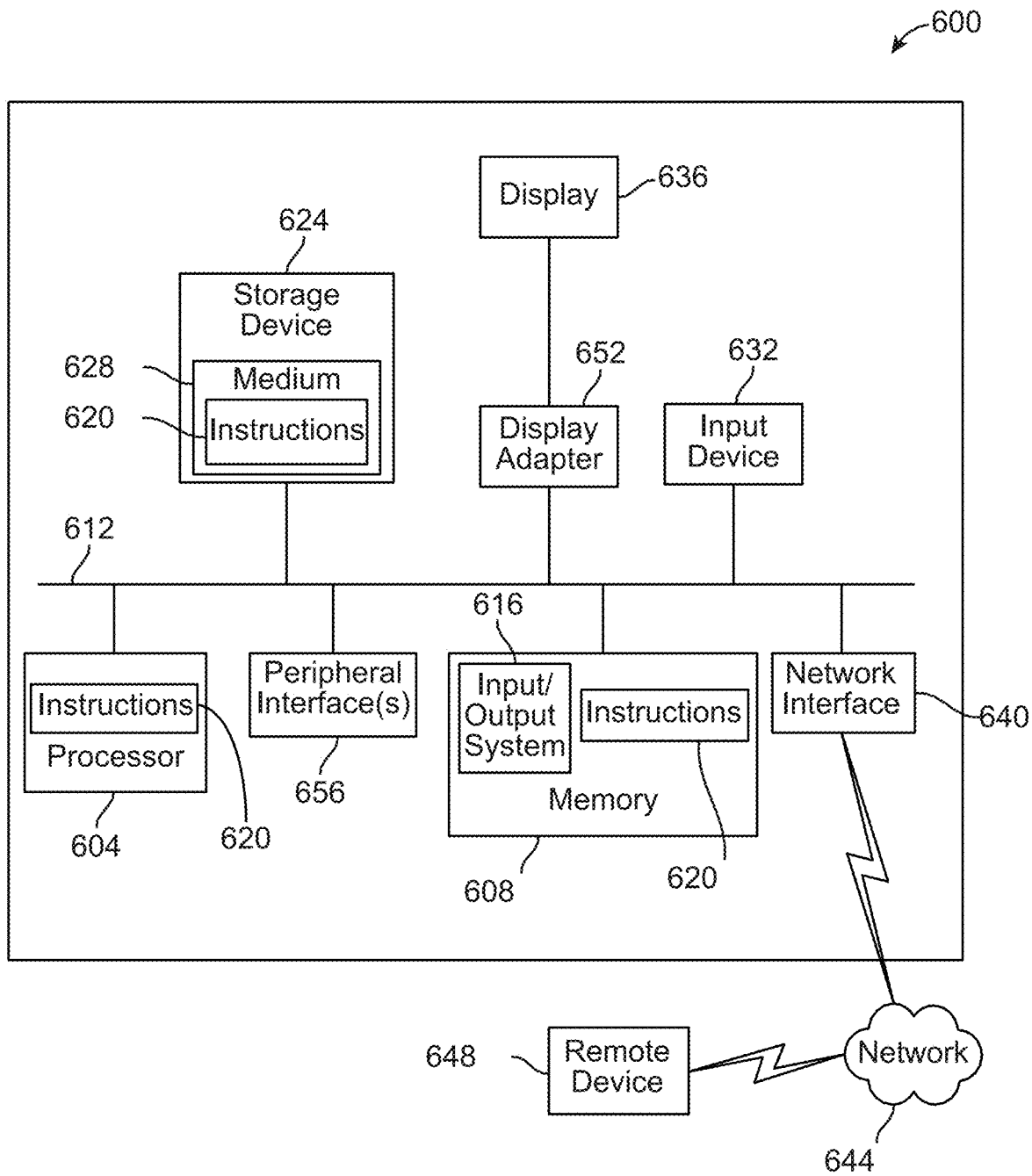
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for monitoring multiparty stream communication, the apparatus comprising:
   at least a processor; and
   a memory communicatively connected to the at least a processor, wherein the memory containing instructions configuring the at least a processor to:
   monitor a multiparty stream communication, wherein the multiparty stream communication includes:
   a first packet series from a first remote device to a communication hub, wherein the first packet series encodes a first audio input sequence; and
   a second packet series from the communication hub to a second remote device;
   generate at least a communication vector using at least one of the first packet series and the second packet series;
   retrieve a target vector representing a semantic target;
   compare the communication vector to the target vector; and
   generate a response as a function of the comparison.

2. The apparatus of claim 1, wherein:
   the first packet series further comprises speech input data of a user; and
   the apparatus is further configured to generate user data as a function of the speech input data.

3. The apparatus of claim 1, wherein retrieving the target vector further comprises retrieving the target vector as a function of user subject data.

4. The apparatus of claim 1, wherein retrieving the target vector further comprises performing a local vector analysis.

5. The apparatus of claim 1, further comprising determining an information depth metric of the communication vector.

6. The apparatus of claim 5, wherein generating the response comprises generating the response as a function of the depth metric of the communication vector.

7. The apparatus of claim 6, wherein generating the depth score further comprises assigning weights to the semantic target.

8. The apparatus of claim 1, wherein generating the response further comprises adapting a large language model as a function of the communication vector and the target vector.

9. The apparatus of claim 1, wherein generating the response further comprises providing feedback and recommendation as a function of depth score.

10. The apparatus of claim 9, wherein displaying the depth score report further comprises:
    receive at least a third packet series;
    generate the depth score;
    compare the result from the first and second packet series; and
    monitor user progress.

11. A method for monitoring multiparty stream communication, the method comprising:
    monitoring a multiparty stream communication, wherein the multiparty stream communication is configured to include:
    a first packet series from a first remote device to a communication hub, wherein the first packet series encodes a first audio input sequence; and
    a second packet series from the communication hub to a second remote device;
    generating at least a communication vector using at least one of the first packet series and the second packet series;
    retrieving a target vector, wherein the target vector is configured to represent a semantic target;
    comparing the communication vector to the target vector; and
    generating a response as a function of the comparison.

12. The method of claim 11, wherein the multiparty stream communication is configured to further comprise a microphone array to:
    collect speech input data of a user; and
    generate user data as a function of the speech input data.

13. The method of claim 11, wherein retrieving a target vector further comprises entering user subject data.

14. The method of claim 11, wherein retrieving a target vector further comprises performing a local vector analysis.

15. The method of claim 11, further comprising determining an information depth metric of the communication vector.

16. The method of claim 15, wherein generating the response comprises generating the response as a function of the depth metric of the communication vector.

17. The method of claim 16, wherein generating the depth score further comprises assigning weights to the semantic target.

18. The method of claim 1, wherein generating a response further comprises adapting a large language model as a function of the communication vector and the target vector.

19. The method of claim 1, wherein generating a response further comprises providing feedback and recommendation based on the depth score.

20. The method of claim 19, wherein displaying the depth score report further comprises:
- receiving at least a third packet series;
- generating the depth score;
- comparing the result from the first and second packet series; and
- monitoring user progress.

\* \* \* \* \*